W. B. WIGLE.

BALL BEARING SPRING CASING HOOK.

APPLICATION FILED AUG. 1, 1916.

Reissued Jan. 23, 1917. 14,253.

Inventor:
Wilson B. Wigle
by Edmund A. Strauss
Atty.

UNITED STATES PATENT OFFICE.

WILSON B. WIGLE, OF FULLERTON, CALIFORNIA.

BALL-BEARING SPRING CASING-HOOK.

14,253. Specification of Reissued Letters Patent. Reissued Jan. 23, 1917.

Original No. 1,177,559, dated March 28, 1916, Serial No. 29,222, filed May 19, 1915. Application for reissue filed August 1, 1916. Serial No. 112,572.

*To all whom it may concern:*

Be it known that I, WILSON B. WIGLE, a citizen of the Dominion of Canada, residing at Fullerton, in the county of Orange and State of California, have invented new and useful Improvements in Ball-Bearing Spring Casing-Hooks, of which the following is a specification.

This invention relates to hooks, especially to hooks designed for handling casings for wells.

It is an object of this invention to provide a casing hook which will eliminate the strain and wear on the threads of the casing elements while screwing or unscrewing the casing.

It is another object of this invention to provide a hook which is secured to the yoke by anti-friction bearings which will permit the attached casing to be rotated without undue resistance.

My invention comprises a hook construction consisting of a yoke, a hook with the shank thereof extending up through the yoke, a sleeve mounted upon the yoke about the hook, a compression coil spring mounted upon the shank and of smaller diameter than the sleeve, and a ball bearing race resting on the top of the spring and under a nut on the end of the shank, and which bears upon the sleeve when a heavy load is placed upon it.

Figure 1:
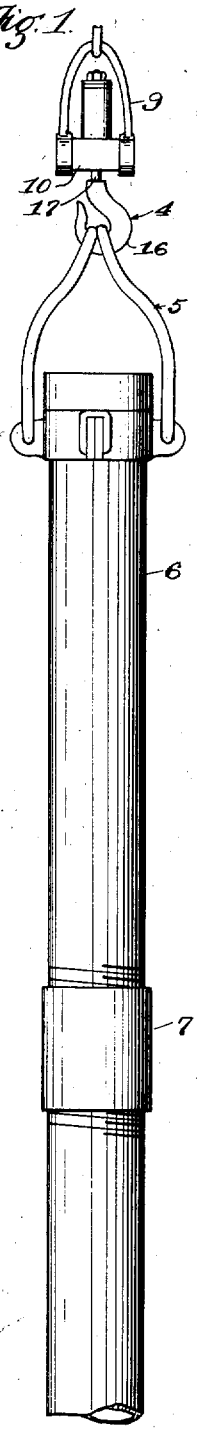
Figure 4:
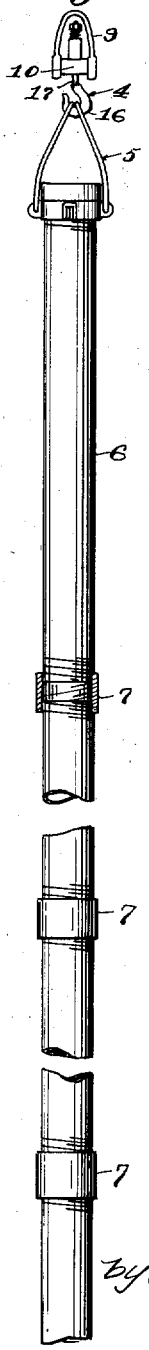
Figure 2:
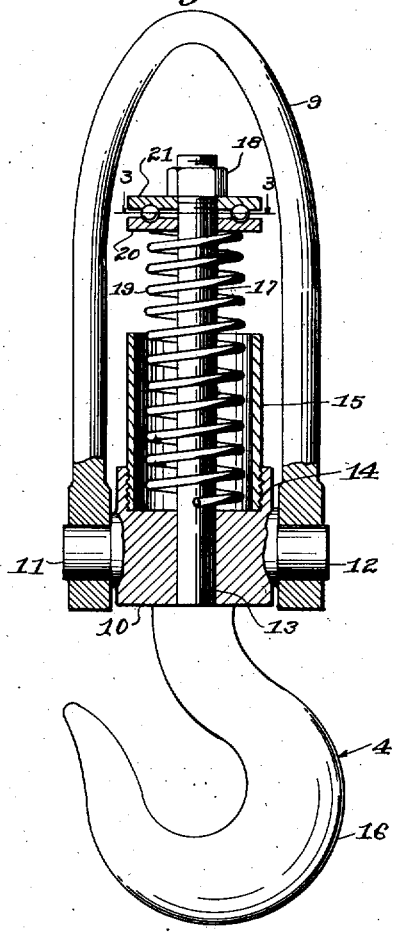
Figure 3:
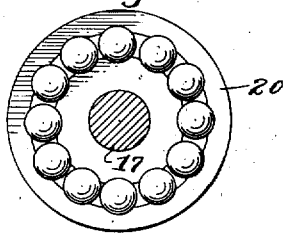

I attain these objects by means of the embodiment of my invention disclosed in the accompanying drawing, in which:

Figure 1 is an elevation of a hook applied to the well casing. Fig. 2 is an enlarged view in elevation of the hook with parts broken away. Fig. 3 is a horizontal section on the line 3—3 of Fig. 2. Fig. 4 is an elevation of a hook supporting a casing with a coupling shown in section.

More specifically, 4 indicates a casing hook from which is supported the usual elevator 5 upon which is disposed a coupling and which supports a section of the well casing 6, a threaded coupling being shown at 7 securing casing section 6 to the casing section 8. The coupling 7 is threaded as are the ends of the casing sections, this being the common and well known means of connecting the sections of well casings together. The hook is supported from a derrick not shown.

In putting in well casings or pulling the same, the casing sections are supported by means of the hook while the casing is being unscrewed. The weight of the casing on the threads results in burring of the same and sticking of the threaded parts, making it difficult to unthread the sections. My casing hook 4 is intended to obviate these objections and comprises a yoke 9 having a cross bar 10 provided with trunnions 11 and 12 which are disposed in apertures in the arms of the yoke 9 thereby providing a pivotal connection. The yoke cross bar 10 is provided with an aperture 13 adapted to loosely receive the shank of a hook. The upper face of cross bar 10 is preferably formed with an internally threaded flange 14, to which is secured a sleeve 15, the sleeve 15 serving as a housing for a compression spring 19 and as a resilient support for hook 16 when the casing is pulled. The hook 16 is provided with a shank 17 which is threaded at the upper end to receive a nut 18. Compression spring 10 is of less diameter than the interior of the sleeve 15 and is disposed about the hook shank 17 engaging at its upper end a ball bearing raceway which is comprised of a disk member 20 provided with a race and a similar member 21 with bearing balls interposed between the two.

In using the hook for pulling a well casing, the elevator 5 is secured thereto, the hook 4 engaged with the elevator and the casing lifted. The weight of the casing causes spring 19 to be compressed and raceway disk 20 to rest on the sleeve, which bears the weight of the casing. As a coupling is unscrewed from the end of a stand the spring 19 lifts the stand, it being of sufficient strength to do so. The spring is selected to exert an expansive force a little greater than the weight of a stand. The ball bearing permits the hook and the casing to be rotated keeping the pipe plumb and allowing any turning with a minimum of resistance. Fig. 1 shows the weight of a casing supported by the hook, the disk 20 resting upon the sleeve 15. As a stand is unscrewed the spring raises it relieving the threads of the weight of the stand. This is illustrated in Fig. 4, where a stand is being removed, the race-way disk 20 being forced upward by the spring 19. In actual practice a stand of casing weighs about one thousand pounds, and the spring 19 is made to support a load of twelve hundred pounds, thus when the spring is compressed so that the disk 20 rests upon the sleeve 15 there is a force of one thousand pounds which lifts the weight of the stand from the coupling threads, and a weight of two hundred pounds more tending to raise the stand as the coupling is unscrewed.

What I claim is:

1. In a hook construction, the combination of a yoke, a hook rotatably mounted on said yoke and movable in a vertical direction, anti-friction bearing means interposed between said hook and said yoke to take the thrust of said hook when a load is placed thereon and permit free rotation of the same, resilient means to carry the load attached to said hook and to return said hook to its normal position after a vertical movement thereof, and means to limit the downward movement of said hook and to relieve the load on said resilient means when the latter has contracted a predetermined amount.

2. In a hook construction, the combination of a yoke, resilient means mounted on said yoke, anti-friction bearing means mounted upon said resilient means, a hook secured to said anti-friction bearing means to permit free rotation of said hook in any position, and means interposed between said yoke and said anti-friction means to relieve the load on said resilient means when the latter has contracted a predetermined distance.

3. In a hook construction, the combination of a yoke, resilient means mounted upon said yoke, anti-friction bearing means mounted upon said resilient means, a hook secured to said antifriction bearing means to permit free rotation of the hook in any position, a fixed support for said anti-friction bearing means located to be engaged thereby when said resilient means has contracted a predetermined distance.

4. In a hook construction, the combination of a yoke including a cross bar having an aperture, a hook provided with a shank, a raceway disk secured thereon, said shank extending through the aperture in said cross bar, a raceway disk rotatably mounted on said shank below said first mentioned disk, rollers disposed between said disks thereby permitting free rotation of the hook in any position, a spring means disposed between said last mentioned raceway disk and cross bar, and a support for said raceway disk spaced therefrom when said spring is expanded.

5. In a hook construction, the combination of a yoke including a cross bar having an aperture, a hook provided with a shank extending through said aperture, anti-friction bearing means secured to the upper end of said shank, a compression spring encompassing said shank and disposed between said cross bar and anti-friction bearing, thereby permitting free rotation of the hook in any position, and a tubular member mounted on said yoke and normally spaced from said anti-friction bearing means.

6. In a hook construction, the combination of a yoke provided with a cross bar having an aperture, a tubular member secured to said cross bar and disposed concentric with said aperture, a hook provided with a shank extending through said aperture, a raceway disk secured to said shank, a raceway disk rotatably mounted on said shank below said first mentioned raceway disk, bearing balls mounted between said raceway disks, thereby permitting free rotation of the hook in any position, and a compression spring disposed about said shank within said tubular member and between said cross bar and raceway disks.

7. In a hook construction, the combination of a yoke, a cross bar having an aperture pivotally mounted in said yoke, a hook provided with a shank extending through said aperture, anti-friction bearing means secured to the upper end of said shank, resilient means mounted upon said cross bar and engaging said anti-friction bearing means thereby permitting free rotation of the hook in any position, and a fixed support for said anti-friction bearing means located to be engaged thereby when said resilient means has contracted a predetermined distance.

8. In a hook construction, the combination of a yoke, a cross bar having an aperture pivotally mounted upon said yoke, a hook provided with a shank, a raceway disk secured thereon, said shank extending through the aperture in said cross bar, a race-way disk rotatably mounted on said shank below said first mentioned disk, rollers disposed between said disks thereby permitting free rotation of the hook in any position, a spring means disposed between said last mentioned raceway disk and cross bar, and a support for said raceway disk spaced therefrom when said spring is expanded.

9. In a hook construction, the combination of a yoke, a cross bar having an aperture pivotally mounted upon said yoke, a tubular member secured to said cross bar and disposed concentric of said aperture, a hook provided with a shank extending through said aperture, a raceway disk secured to said shank, a raceway disk rotatably mounted on said shank below said first mentioned race-way disk, bearing balls mounted between said race-way disks, thereby permitting free rotation of the hook in any position, and a compression spring disposed about said shank within said tubular member and between said cross bar and raceway disks.

WILSON B. WIGLE.